United States Patent
Huo et al.

(10) Patent No.: US 11,218,701 B2
(45) Date of Patent: Jan. 4, 2022

(54) VIDEO COLOUR COMPONENT PREDICTION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN); Xiaoyan Chai, Guangdong (CN); Yanzhuo Ma, Guangdong (CN); Fuzheng Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/170,589

(22) Filed: Feb. 8, 2021

(65) Prior Publication Data
US 2021/0160505 A1    May 27, 2021

Related U.S. Application Data

(63) Continuation of application No. PCT/CN2018/099703, filed on Aug. 9, 2018.

(51) Int. Cl.
*H04N 19/126* (2014.01)
*H04N 19/176* (2014.01)
*H04N 19/186* (2014.01)

(52) U.S. Cl.
CPC ......... *H04N 19/126* (2014.11); *H04N 19/176* (2014.11); *H04N 19/186* (2014.11)

(58) Field of Classification Search
CPC ............... H04N 19/126; H04N 19/176; H04N 19/186
See application file for complete search history.

(56) References Cited

U.S. PATENT DOCUMENTS

| 8,619,857 | B2 | 12/2013 | Jie |
| 9,083,974 | B2 | 7/2015 | Yongjoon |

(Continued)

FOREIGN PATENT DOCUMENTS

| CN | 101600109 A | 12/2009 |
| CN | 102823256 A | 12/2012 |

(Continued)

OTHER PUBLICATIONS

International Search Report in the international application No. PCT/CN2018/099703, dated May 9, 2019.

(Continued)

*Primary Examiner* — Tsion B Owens
(74) *Attorney, Agent, or Firm* — Perkins Coie LLP

(57) ABSTRACT

A video colour component prediction method and apparatus, and a computer storage medium are provided. The prediction method includes: obtaining a first colour component neighboring reference value and a first colour component reconstructed value corresponding to a current coding block, wherein the first colour component neighboring reference value represents a first colour component parameter corresponding to a neighboring reference sample of the current coding block, and the first colour component reconstructed value represents one or more reconstruction parameters of a first colour component corresponding to the current coding block; determining a weight coefficient corresponding to the neighboring reference sample; determining a scale factor according to the weight coefficient and the first colour component neighboring reference value; and obtaining a second colour component predicted value corresponding to the current coded block based on a linear model corresponding to the scale factor.

30 Claims, 5 Drawing Sheets

(56) References Cited

U.S. PATENT DOCUMENTS

| | | | |
|---|---|---|---|
| 10,609,410 B2* | 3/2020 | Jeon | H04N 19/577 |
| 2009/0010333 A1 | 1/2009 | Alexandros | |
| 2011/0249731 A1 | 10/2011 | Jie | |
| 2011/0280304 A1 | 11/2011 | Yongjoon | |
| 2018/0063527 A1 | 3/2018 | Chen et al. | |
| 2018/0077426 A1* | 3/2018 | Zhang | H04N 19/117 |
| 2020/0213584 A1* | 7/2020 | Gamei | H04N 19/129 |
| 2020/0413062 A1* | 12/2020 | Onno | H04N 19/105 |

FOREIGN PATENT DOCUMENTS

| | | |
|---|---|---|
| CN | 102972028 A | 3/2013 |
| CN | 103379321 A | 10/2013 |
| CN | 107580222 A | 1/2018 |
| RU | 2556396 C2 | 7/2015 |
| WO | 2007089696 A2 | 8/2007 |
| WO | 2013067667 A1 | 5/2013 |
| WO | 2018045207 A1 | 3/2018 |

OTHER PUBLICATIONS

Christophe Gisquet et al: "Model Correction for Cross-Channel Chroma Prediction", Data Compression Conference (DCC), 2013, IEEE, Mar. 20, 2013 (Mar. 20, 2013), pp. 23-32, XP032429394, DO1: 10.1109/DCC.2013.10, ISBN: 978-1-4673-6037-1, section 4.

Xingyu Zhang et al: "Chroma Intra Prediction Based on Inter-Channel Correlation for HEVC", IEEE Transactions on Image Processing, vol. 23, No. 1, Jan. 1, 2014 (Jan. 1, 2014), pp. 274-286, XP055148456, ISSN: 1057-7149, DOI: 10.1109/TIP.2013.2288007, section III.

Zhang Kai et al: "Multi-model based cross-component linear model chroma intra-prediction for video coding", 2017 IEEE Visual Communications and Image Processing (VCIP), IEEE, Dec. 10, 2017 (Dec. 10, 2017), pp. 1-4, XP033325781, D01:10.1109/VCIP.2017. 8305103, the whole document.

Supplementary European Search Report in the European application No. 18929200.6, dated Jun. 16, 2021, 13 pages.

First Office Acrtion of the Russian application No. 2021105244, dated Oct. 22, 2021. 14 pages with English translation.

* cited by examiner

VIDEO COLOUR COMPONENT PREDICTION METHOD AND APPARATUS, AND COMPUTER STORAGE MEDIUM

CROSS-REFERENCE TO RELATED APPLICATION

This is a continuation application of International Application No. PCT/CN2018/099703 filed on Aug. 9, 2018, the contents of which are incorporated herein by reference in its entirety.

TECHNICAL FIELD

Embodiments of the disclosure relate to intra prediction technologies in the field of video coding, and more particularly to a method and apparatus for predicting a video colour component and a computer storage medium.

BACKGROUND

In the next-generation video coding standard H.266 or Versatile Video Coding (VCC), prediction from a luma value to a chroma value or between chroma values may be implemented by a color Cross-component Linear Model Prediction (CCLM) method. Specifically, a linear regression method may be used to construct a linear model for neighboring luma parameters and chroma parameters corresponding to a current coding block, and thus a chroma predicted value may be calculated according to the linear model and a reconstructed luma value.

However, when the linear model is constructed, not all factors are considered at present. For example, when the chroma value is predicted with the luma value, such factors as neighboring reference luma values and neighboring reference chroma values are considered mostly; and when the prediction is performed between the chroma values, such factors as neighboring reference chroma components are considered mostly. Therefore, once the neighboring reference luma values are greatly deviated from corresponding parameters of the current coding block, or, the neighboring reference chroma components are greatly deviated from the corresponding parameters of the current coding block, the calculated linear model has deviations from an expected model; and thus, the prediction accuracy of the chroma predicted value of the current coding block is reduced, and the chroma predicted value is greatly deviated from a real chroma value.

SUMMARY

In order to solve the above technical problems, the embodiments of the disclosure provide a method and apparatus for predicting a video colour component and a computer storage medium, which can improve prediction accuracy of a second colour component predicted value effectively, and enable the second colour component predicted value to be closer to a real component value.

The technical solutions in the embodiments of the disclosure are implemented as follows.

A method for predicting a video colour component may include the following operations.

A first colour component neighboring reference value and a first colour component reconstructed value corresponding to a current coding block are acquired. The first colour component neighboring reference value represents a first colour component parameter corresponding to a neighboring reference sample of the current coding block, and the first colour component reconstructed value represents one or more reconstructed parameters of the first colour component corresponding to the current coding block.

A correlation coefficient is determined according to the first colour component neighboring reference value and the first colour component reconstructed value. The correlation coefficient represents a degree of colour component deviation between the current coding block and the neighboring reference sample.

A weight coefficient corresponding to the neighboring reference sample is obtained by inputting the correlation coefficient to a preset weight calculation model.

A scaling factor is determined according to the weight coefficient.

A second colour component predicted value corresponding to the current coding block is obtained based on the scaling factor.

According to the method and apparatus for predicting the video colour component and the computer storage medium provided by the embodiments of the disclosure, the prediction apparatus acquires the corresponding first colour component neighboring reference values and first colour component reconstructed value of the current coding block, the first colour component neighboring reference value representing the first colour component parameter corresponding to the neighboring reference sample of the current coding block, and the first colour component reconstructed value representing one or more reconstructed parameters of the first colour component corresponding to the current coding block; determines the correlation coefficient according to the first colour component neighboring reference value and the first colour component reconstructed values the correlation coefficient representing a degree of colour component deviation between the current coding block and the neighboring reference sample; obtains the corresponding weight coefficient of the neighboring reference sample by inputting the correlation coefficient to a preset weight calculation model; determines the scaling factor according to the weight coefficient; and obtains the corresponding second colour component predicted value of the current coding block based on the scaling factor. Therefore, in the embodiments of the disclosure, the prediction apparatus may determine correlation coefficients based on the corresponding first colour component neighboring reference values and first colour component reconstructed values of the current coding block, thereby allocating different weight coefficients to different neighboring reference samples according to correlations of component parameters between the neighboring reference samples and the current coding block to construct a linear model that is more suitable for the expected model, so as to effectively overcome the defects that the linear model is deviated from the expected model when the first colour component neighboring reference values are greatly deviated from corresponding component parameters of the current coding block, or, the third colour component neighboring reference values are greatly deviated from the corresponding component parameters of the current coding block, and greatly improve the prediction accuracy of the video colour component predicted value when predicting components of the current coding block according to the linear model, thereby making the video colour component predicted value closer to a real video colour component value.

DETAILED DESCRIPTION

The technical solutions in the embodiments of the disclosure will be described below clearly and completely, in combination with the accompanying drawings in the embodiments of the disclosure. It may be understood that the specific embodiments described herein are merely used for explaining the relevant application, rather than limiting the disclosure. In addition, it is further to be noted that, for the ease of description, only the parts related to the relevant application are illustrated in the accompanying drawings.

In a video picture, a first colour component, a second colour component and a third colour component are usually adopted to represent coding blocks. The first colour component, the second colour component and the third colour component may include one luma component and two chroma components. Specifically, the luma component is usually represented by a sign Y, and the chroma components are usually represented by signs Cb and Cr. Cb is a blue chroma component and Cr is a red chroma component.

It is to be noted that, in the embodiments of the disclosure, the first colour component, the second colour component and the third colour component may respectively be the luma component Y, the blue chroma component Cb, and the red chroma component Cr. For example, the first colour component may be the luma component Y, the second colour component may be the red chroma component Cr, and the third colour component may be the blue chroma component Cb, which are not specifically defined in the embodiments of the disclosure.

Further, in the embodiments of the disclosure, the commonly-used sampling format in which the luma component and the chroma component are separately represented is also referred to as a YCbCr format. The YCbCr format may include a 4:4:4 format, a 4:2:2 format and a 4:2:0 format.

Under the condition that the YCbCr 4:2:0 format is adopted for, if the luma component of the video picture is a coding block with a size of 2N*2N, the corresponding chroma component is a coding block with a size of N*N, where N is a side length of the coding block. In the embodiments of the disclosure, the following descriptions are made with the 4:2:0 format as an example. However, the technical solutions of the embodiments of the disclosure are also applied to other sampling formats.

Figure 1:
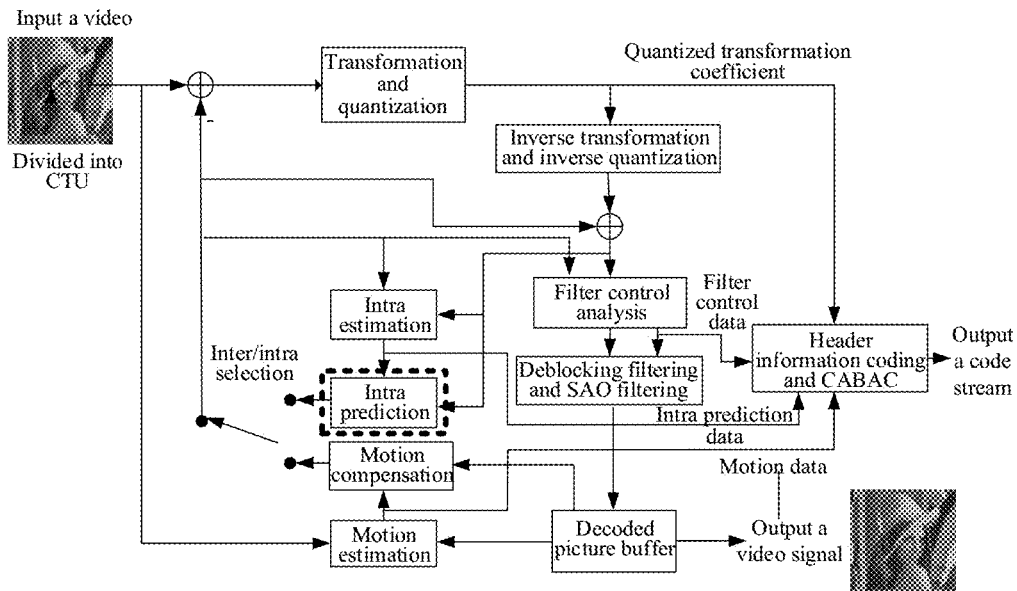
FIG. 1 is a schematic diagram of a video coding process.
Figure 2:
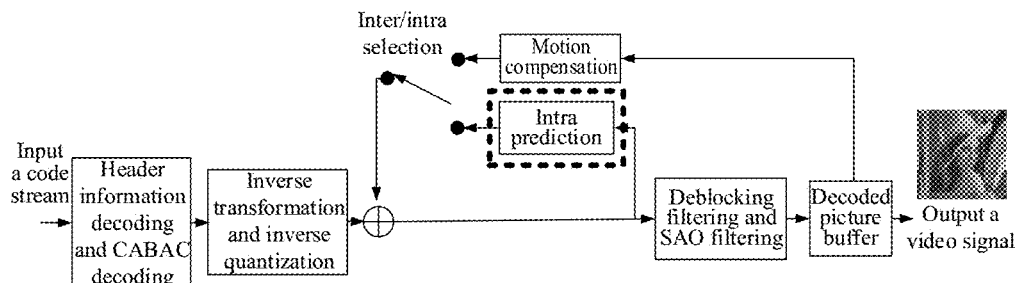
FIG. 2 is a schematic diagram of a video decoding process.

In the embodiments of the disclosure, the method for predicting a video colour component may be applied to the intra prediction section in a video coding hybrid framework. Specifically, the method for predicting the video colour component may be available to both a coding terminal and a decoding terminal at the same time. For example, FIG. 1 is a schematic diagram of a video coding process. As illustrated in FIG. 1, the video coding may include multiple specific steps such as intra estimation, intra prediction and motion compensation, and the method for predicting a video colour component provided by the disclosure may be applied to the intra prediction section. FIG. 2 is a schematic diagram of a video decoding process. As illustrated in FIG. 2, the video decoding may include multiple specific steps such as filtering, intra prediction and motion compensation, and the method for predicting a video colour component provided by the disclosure may be applied to the intra prediction section.

In H.266, for further improving the coding performance and coding efficiency, Cross-Component Prediction (CCP) is extended and improved, and Cross-Component Linear Model Prediction (CCLM) is proposed. In H.266, CCLM implements prediction from the first colour component to the second colour component, from the first colour component to the third colour component and between the second colour component and the third colour component. The following descriptions are made with prediction from the first colour component to the second colour component as an example, but the technical solutions of the embodiments of the disclosure may also be applied to prediction of other colour components.

Specifically, in the related art, when the prediction from the luma component to the chroma component is implemented by the CCLM method, a cross-component linear model prediction mode is used in a decoder of the next-generation video coding standard such as an H.266/VVC early test model (Joint Exploration Model, JEM) or VVC test model (VTM) in order to reduce redundancy between the luma component and the chroma component as well as between different chroma components. For example, according to the formula (1), a reconstructed luma value of the same coding block is used to construct a predicted value of the chroma:

$$\text{Pred}_C[i,j] = \alpha \cdot \text{Rec}_L[i,j] + \beta \qquad (1)$$

i, j represents a position coordinate of a sampling point in the coding block, i represents a horizontal direction and j represents a vertical direction, $\text{Pred}_C[i,j]$ represents a second colour component predicted value of a sampling point with a position coordinate [i, j] in the coding block, $\text{Rec}_L[i, j]$ represents a first colour component reconstructed value of the sampling point with the position coordinate in the same coding block (after down-sampling). $\alpha$ and $\beta$ are scaling factors of a linear model and may be deduced by minimizing regression errors of first colour component neighboring reference values and second colour component neighboring reference values, as illustrated in the following formula (2):

$$\begin{cases} \alpha = \dfrac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \\ \beta = \dfrac{\sum C(n) - \alpha \cdot \sum L(n)}{N} \end{cases} \qquad (2)$$

Figure 3:
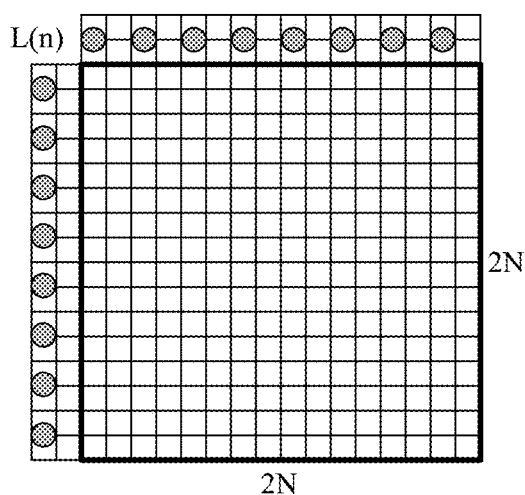
FIG. 3 is a first position schematic diagram for neighboring reference sampling.
Figure 4:
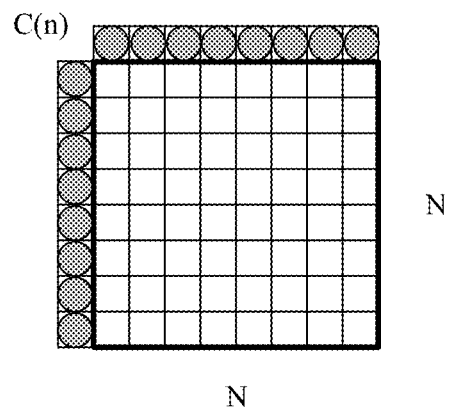
FIG. 4 is a second position schematic diagram for neighboring reference sampling.

L(n) represents a first colour component neighboring reference value (for example, on the left side and the upper side) after down-sampling, C(n) represents a second colour component neighboring reference value (for example, on the left side and the upper side), and N is the number of second colour component neighboring reference values. FIG. 3 is a first position schematic diagram for neighboring reference sampling, and FIG. 4 is a second position schematic diagram for neighboring reference sampling. As illustrated in FIG. 3 and FIG. 4, L(n) and C(n) are neighboring reference pixel points, and N is the number of second colour component neighboring reference values. With regard to the video picture of the 4:2:0 format, the first colour component coding block has the size of 2N*2N, as illustrated in FIG. 3, and the corresponding second colour component has the size of N*N, as illustrated in FIG. 4. The two equations may be directly applied to the square coding block. With regard to a non-square coding block, the neighboring sampling of the long side is first subjected to down-sampling to obtain the sampling number equal to that of the short side. Both α and β are not transmitted, but calculated through the formula (2) in the decoder, which is not specifically defined in the embodiments of the disclosure.

Figure 5:
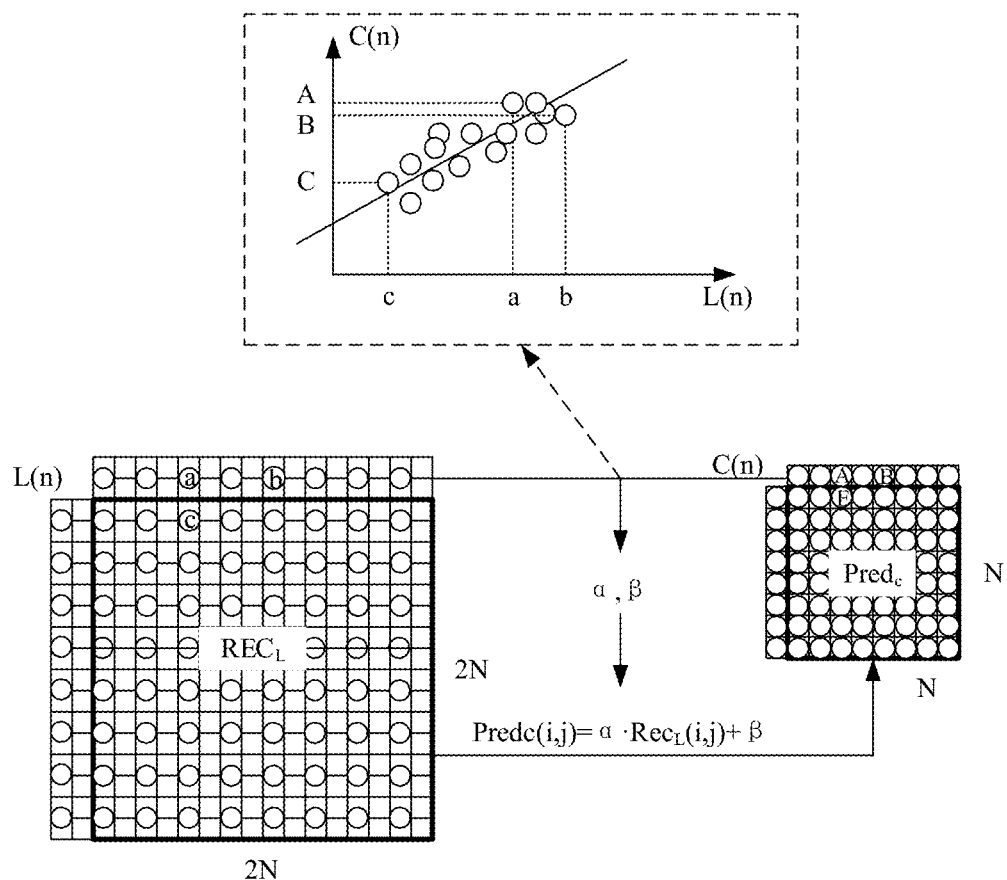
FIG. 5 is a first schematic diagram for determining a linear model in the related art.

FIG. 5 is a first schematic diagram for determining a linear model in the related art. As illustrated in FIG. 5, a, b and c are first colour component neighboring reference values, A, B and C are the second colour component neighboring reference values, e is the first colour component reconstructed value of the current coding block, and E is the second colour component predicted value of the current coding block. α and β may be calculated according to the formula (2) by using all first colour component neighboring reference values L(n) and second colour component neighboring reference values C(n) of the current coding block. Then, the first colour component reconstructed value e of the current coding block is substituted into the linear model of the formula (1) to calculate the second colour component predicted value E of the current coding block.

Specifically, in the related art, in addition to the method for predicting the chroma component with the luma component, i.e., the method for predicting the second colour component with the first colour component, or predicting the third colour component with the first colour component, the CCLM prediction mode further includes prediction between two chroma components, i.e., the method for prediction between the second colour component and the third colour component. In the embodiments of the disclosure, not only may the Cr component be predicted from the Cb component, but the Cb component may also be predicted from the Cr component.

It is to be noted that, in the embodiments of the disclosure, the prediction between the chroma components in CCLM, i.e., the prediction between the second colour component and the third colour component may be applied to a residual domain. With prediction of the Cr component as an example, the Cb residual may be used to predict the Cr residual. The final predicted value of the Cr component is obtained by adding a reconstructed Cb residual having a weight to a conventional intra predicted value of the Cr component, as illustrated in a formula (3):

$$Pred^*_{Cr}[i,j] = \gamma \cdot resi_{Cb}'[i,j] + Pred_{Cr}[i,j] \quad (3)$$

Where $pred_{Cr}^*[i, j]$ represents the final predicted value of the Cr component of the sampling point with the position coordinate [i, j] in the current coding block, and $resi_{Cb}'(i, j)$ is a predicted residual of the reconstructed Cb component. The calculation of the scaling factor γ is the same as calculation of the predicted model parameter from the luma component to the chroma component in CCLM, and only difference is to increase a regression cost relevant to the default value γ in an error function, such that the obtained scaling factor γ is biased to the default value of −0.5. Specifically, the scaling factor γ may be calculated according to the formula (4):

$$\gamma = \frac{N \cdot \sum (Cb(n) \cdot Cr(n)) - \sum Cb(n) \cdot \sum Cr(n) + \lambda \cdot (-0.5)}{N \cdot \sum (Cb(n) \cdot Cb(n)) - \sum Cb(n) \cdot \sum Cb(n) + \lambda} \quad (4)$$

Where Cb(n) represents a neighboring reference Cb value of the current coding block, Cr(n) represents a neighboring reference Cr value of the current coding block, and λ may be an empirical value, for example, $\lambda = \Sigma(Cb(n).Cb(n)) \gg 9$.

Figure 6:
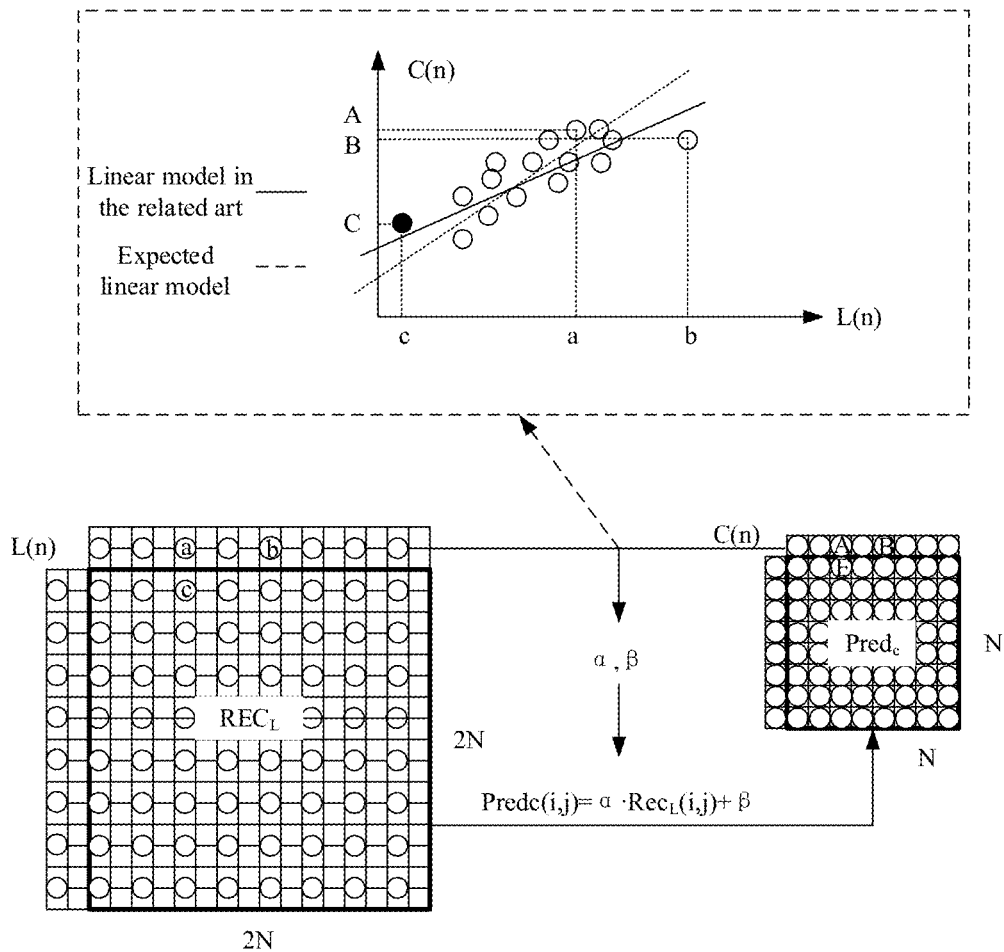
FIG. 6 is a second schematic diagram for determining a linear model in the related art.

However, in the related art, when the second colour component or the third colour component is predicted according to the first colour component to calculate the linear model, only the first colour component neighboring reference values, the second colour component neighboring reference values or the third colour component neighboring reference values may be considered. For example, as illustrated in FIG. 5, all first colour component neighboring reference values L(n) and all second colour component neighboring reference values C(n) that are adjacent are used to calculate the scaling factors α and β. Then, the first colour component reconstructed values of the current coding block are substituted into the linear model to obtain second colour component predicted values of the current coding block. During this process, the correlation between the first colour component reconstructed value and the first colour component neighboring reference value of the current coding block is not considered. If the first colour component neighboring reference values deviated more from the present luma value are used to construct the linear model, the second colour component predicted value or third colour component predicted value of the current coding block may be far deviated from the actual colour component value to reduce the prediction accuracy. For example, FIG. 6 is a second schematic diagram for determining a linear model in the related art. As illustrated in FIG. 6, the pixel points b and c are deviated from the reconstructed luma value of the current coding block, and correspondence of the pixel points b and c with corresponding chroma values thereof are deviated from a linear relationship between the reconstructed luma value and the corresponding chroma value of the current coding block. According to calculation methods in the related art, the two pixel points b and c are also used as parameters to calculate the linear model, which results in that the deduced linear model is deviated from the expected linear model.

In the embodiments of the disclosure, the method for predicting a video colour component provides a scheme for calculating the linear model based on component correlation. Specifically, when one or more scaling factors of the linear model are calculation, not only the first colour component neighboring reference values, the second colour component neighboring reference values or the third colour component neighboring reference values but also the correlations and similarities between the first colour component reconstructed values and the first colour component neighboring reference values of the current coding block are considered; and then, the neighboring reference pixel samples are weighted or screened according to the similarities. Therefore, parameters of the linear model are closer to the present first colour component reconstructed values, which further makes the second colour component predicted value or the third colour component predicted value of the current coding block more accurate.

The technical solutions in the embodiments of the disclosure are described below clearly and completely in combination with the accompanying drawings in the embodiments of the disclosure. In the following embodiments of the disclosure, the first colour component may be the luma component Y, the second colour component may be the red chroma component Cr, and the third colour component may be the blue chroma component Cb, which are not specifically defined in the embodiments of the disclosure.

Embodiment 1

Figure 7:
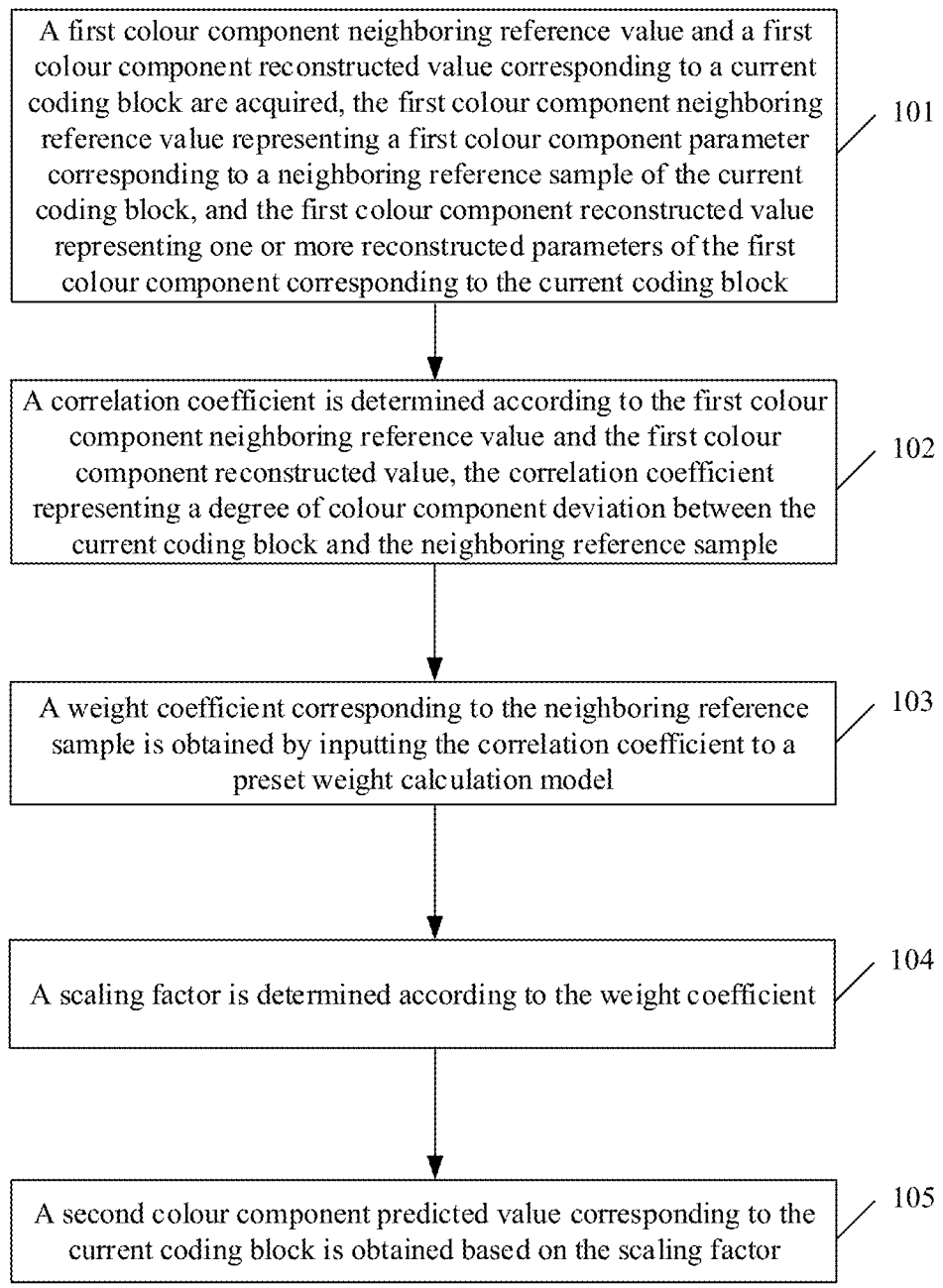
FIG. 7 is an implementation flowchart of a method for predicting a video colour component provided by an embodiment of the disclosure.

The embodiment of the disclosure provides a method for predicting a video colour component. FIG. 7 is an implementation flowchart of a method for predicting a video colour component provided by an embodiment of the disclosure. As illustrated in FIG. 7, in the embodiment of the disclosure, the method for predicting the video colour component by the prediction apparatus may include the following operations.

In 101, a first colour component neighboring reference value and a first colour component reconstructed value corresponding to a current coding block are acquired, the first colour component neighboring reference value representing a first colour component parameter corresponding to a neighboring reference sample of the current coding block, and the first colour component reconstructed value representing one or more reconstructed parameters of the first colour component corresponding to the current coding block.

In the embodiment of the disclosure, the prediction apparatus may first acquire the corresponding first colour component neighboring reference value and first colour component reconstructed value of the current coding block. It is to be noted that, in the embodiment of the disclosure, the current coding block is a coding block divided by the prediction apparatus and including at least one pixel point.

It is to be noted that, in the embodiment of the disclosure, the first colour component neighboring reference value is used to represent the first colour component parameter corresponding to the neighboring reference sample of the current coding block. With regard to the down-sampling manner, when the current coding block includes one pixel point, the corresponding neighboring reference samples may be one pixel point on the upper side and one pixel point on the left side of the pixel point. When the current coding block includes multiple pixel points, the corresponding neighboring reference samples may be multiple pixel points on the upper sides and the left sides of the multiple pixel points.

Further, in the embodiment of the disclosure, the neighboring reference samples are pixel points adjacent to the current coding block. Specifically, in the embodiment of the disclosure, for the down-sampling manner, the neighboring reference samples may be neighboring pixel points located on the left side and the upper side of the current coding block.

It is to be noted that, in the embodiment of the disclosure, when acquiring the first colour component neighboring reference values, the prediction apparatus may acquire all first colour component neighboring reference values corresponding to the neighboring reference samples. Specifically, in the embodiment of the disclosure, one neighboring reference sample corresponds to one first colour component neighboring reference value, i.e., when the neighboring reference samples are multiple pixel points, the prediction apparatus may acquire multiple first colour component neighboring reference values corresponding to the multiple pixel points.

Further, in the embodiment of the disclosure, the first colour component reconstructed value is used to represent one or more reconstructed parameters of the first colour component corresponding to the current coding block. Specifically, in the embodiment of the disclosure, when the current coding block includes one pixel point, there is one reconstructed parameter of the corresponding first colour component; and when the current coding block includes multiple pixel points, there are multiple reconstructed parameters of the corresponding first colour component.

It is to be noted that, in the embodiment of the disclosure, when acquiring the first colour component reconstructed value, the prediction apparatus may acquire all first colour component reconstructed values corresponding to the current coding block. Specifically, in the embodiment of the disclosure, one pixel point in the current coding block corresponds to one first colour component reconstructed value.

In 102, a correlation coefficient is determined according to the first colour component neighboring reference value and the first colour component reconstructed value, the correlation coefficient representing a degree of colour component deviation between the current coding block and the neighboring reference sample.

In the embodiment of the disclosure, after acquiring the first colour component neighboring reference value and first colour component reconstructed value corresponding to the current coding block, the prediction apparatus may further determine the correlation coefficient according to the first colour component neighboring reference value and the first colour component reconstructed value.

It is to be noted that, in the embodiment of the disclosure, the correlation coefficient may be used to represent the degree of colour component deviation between the current coding block and the neighboring reference sample. Specifically, the correlation coefficient may be configured to represent the correlation between the first colour component reconstructed value corresponding to the current coding block and the first colour component neighboring reference value corresponding to the neighboring reference sample.

Further, in the embodiment of the disclosure, when determining the correlation coefficient according to the first colour component neighboring reference value and the first colour component reconstructed value, the prediction apparatus may perform difference calculation on the first colour component neighboring reference value and the first colour component reconstructed value, and further determine the correlation coefficient according to the difference result. Meanwhile, when determining the correlation coefficient according to the first colour component neighboring reference value and the first colour component reconstructed value, the prediction apparatus may perform matrix multiplication on a matrix corresponding to the first colour component neighboring reference values and a matrix corresponding to the first colour component reconstructed values, and further determine the correlation coefficients according to multiplication results.

In 103, a weight coefficient corresponding to the neighboring reference sample is obtained by inputting the correlation coefficient to a preset weight calculation model.

In the embodiment of the disclosure, after determining the correlation coefficient according to the first colour component neighboring reference value and the first colour component reconstructed value, the prediction apparatus may input the correlation coefficient to a preset weight calculation model, so as to obtain the corresponding weight coefficient of the neighboring reference sample.

It is to be noted that, in the embodiment of the disclosure, the preset weight calculation model is a calculation model preset by the prediction apparatus and configured to allocate weights according to the correlation coefficients.

Further, in the embodiment of the disclosure, the weight coefficients may be weight values calculated according to the correlations between the neighboring reference samples and the current coding block when a second colour component predicted value corresponding to the current coding block is predicted.

It is to be noted that, in the embodiment of the disclosure, the higher the correction between one reference sample in the neighboring reference samples and the current coding block, the larger the weight value corresponding to the one reference sample.

It is to be noted that, in the embodiment of the disclosure, when the second colour component predicted value is calculated, any of the neighboring reference samples has a corresponding weight coefficient.

Further, in the embodiment of the disclosure, when determining the weight coefficients, the prediction apparatus may perform calculation through the preset weight calculation model. Specifically, in the embodiment of the disclosure, the weight calculation model is illustrated in the following formula (5):

$$w(n) = e^{-\frac{(min(L(n) - Rec_L[i,j]))^2}{2 \cdot \sigma^2}} \quad (5)$$

Where, L(n) represents a first colour component neighboring reference value of the left side and the upper side during down-sampling, $Rec_L(i, j)$ is a current first colour component reconstructed value, and a is a value relevant to a quantization parameter during coding.

In 104, a scaling factor is determined according to the weight coefficient.

In the embodiment of the disclosure, after inputting the correlation coefficient to the preset weight calculation model to obtain the corresponding weight coefficient of the neighboring reference sample, the prediction apparatus may determine the scaling factor according to the weight coefficient.

It is to be noted that, in the embodiment of the disclosure, the scaling factor may be a coefficients in the linear model that is obtained when the prediction apparatus predicts the video colour component.

Further, in the embodiment of the disclosure, the scaling factors for different prediction modes are different coefficients. For example, when the prediction apparatus predicts the second colour component or the third colour component through the first colour component, the scaling factors may be α and β in the formula (1); and when the prediction apparatus performs the prediction between the second colour component and the third colour component, the scaling factor may be γ in the formula (3).

In 105, a second colour predicted value corresponding to the current coding block is obtained based on the scaling factor.

In the embodiment of the disclosure, after determining the scaling factor according to the weight coefficient, the prediction apparatus may further obtain the corresponding second colour component predicted value of the current coding block based on the scaling factor. The second colour component predicted value is a predicted result obtained when the prediction apparatus performs prediction on the second component of the current coding block.

It is to be noted that, in the embodiment of the disclosure, when obtaining the second colour component predicted value according to the scaling factor, the prediction apparatus may first establish a linear model for predicting the video colour component according to the scaling factor.

Further, in the embodiment of the disclosure, for different prediction modes, the linear model established by the prediction apparatus is also different, i.e., the linear model established in the prediction of the second colour component or the third colour component with the first colour component is different from that established in the prediction between the second colour component and the third colour component.

It is to be noted that, in the embodiment of the disclosure, the second colour component predicted value obtained during predicting the second colour component or the third colour component with the first colour component is the second colour component or third colour component corresponding to the current coding block, i.e., Cb component or Cr component; and the second colour component predicted value obtained in the prediction between the second colour component and the third colour component is the second colour component or third colour component corresponding to the current coding block, i.e., Cb component or Cr component.

Further, in the embodiment of the disclosure, after establishing the linear model according to the scaling factor, the prediction apparatus may predict the video colour component of the current coding block according to the linear model, to obtain the second colour component prediction value.

Further, in the embodiment of the disclosure, there are two CCLM prediction modes, one being a single model CCLM prediction mode, and the other being a Multiple Model CCLM (MMLM) prediction mode and also called the MMLM prediction mode. As its name implies, the single model CCLM prediction mode is to predict the second colour component or the third colour component from the first colour component only with one linear model, and the MMLM prediction mode is to predict the second colour component or the third colour component from the first colour component with multiple linear models. For example, in the MMLM prediction mode, the first colour component neighboring reference values and the second colour component neighboring reference values of the current coding block are divided into two groups, and each group may independently serve as a training set to deduce parameters of the linear model, i.e., each group can deduce a group of scaling factors. Therefore, the method for predicting a video colour component provided by the embodiment of the disclosure may also be applied to the MMLM prediction mode, and may also overcome the defects that the linear model is deviated from the expected model when the first colour component neighboring reference values are greatly deviated from corresponding component parameters of the current coding block, or, the third colour component neighboring reference values are greatly deviated from the corresponding component parameters of the current coding block, thereby greatly improving the prediction accuracy of the second colour component predicted value when the second colour component of the current coding block is predicted according to the linear model.

In the embodiment of the disclosure, the prediction apparatus may determine correlation coefficients based on the first colour component neighboring reference values and first colour component reconstructed values corresponding to the current coding block, thereby allocating different weight coefficients to different neighboring reference samples according to correlations of component parameters between the neighboring reference samples and the current coding block to construct a linear model that is more suitable for the expected model, so as to effectively overcome the defects that the linear model is deviated from the expected model when the first colour component neighboring reference values are greatly deviated from corresponding component parameters of the current coding block, or, the third colour component neighboring reference values are greatly deviated from the corresponding component parameters of the current coding block, and greatly improve the prediction accuracy of the video colour component predicted value when predicting components of the current coding block according to the linear model, thereby making the video colour component predicted value closer to a real video colour component value.

Embodiment 2

Based on Embodiment 1, in the embodiment of the disclosure, the method that the prediction apparatus determines the correlation coefficient according to the first colour component neighboring reference value and the first colour component reconstructed value may include the following operations.

In 102a, difference calculation is performed between any reference value in first colour component neighboring reference values and each first colour component reconstructed value to obtain component differences corresponding to the any reference value. One first colour component neighboring reference value and one first colour component reconstructed value corresponding to one difference.

In the embodiment of the disclosure, after acquiring the first colour component neighboring reference values and first colour component reconstructed values corresponding to the current coding block, the prediction apparatus may respectively perform difference calculation between any reference value in the first colour component neighboring reference values and each first colour component reconstructed value to obtain the component differences corresponding to the any reference value.

It is to be noted that, in the embodiment of the disclosure, one of the first colour component neighboring reference values and one of the first colour component reconstructed values correspond to one difference.

Further, in the embodiment of the disclosure, the prediction apparatus respectively performs the difference calculation between any reference value in the first colour component neighboring reference values and each first colour component reconstructed value, which may represent degrees of video colour component correlation between the neighboring reference samples and the current coding block.

In the embodiment of the disclosure, it may be considered that the correlation between the neighboring reference sample and the current coding block is lower as the component difference is greater.

In 102b, a minimum difference in component differences is determined as the correlation coefficient.

In the embodiment of the disclosure, after performing the difference calculation between any reference value in the first colour component neighboring reference values and each first colour component reconstructed value to obtain the component differences corresponding to the any reference value, the prediction apparatus may determine a minimum difference in the component differences as the correlation coefficient.

It is to be noted that, in the embodiment of the disclosure, after determining the minimum difference from the component differences, the prediction apparatus may determine the correlation coefficient according to the minimum difference.

Further, in the embodiment of the disclosure, it may be considered that the correlation between the neighboring reference sample and the current coding block is higher as the component difference is smaller. Thus, the prediction apparatus may determine the correlation factor according to the minimum difference in the component differences.

Further, in the embodiment of the disclosure, after the prediction apparatus respectively performs the difference calculation between any reference value in the first colour component neighboring reference values and each first colour component reconstructed value to obtain the component differences corresponding to the any reference value and before the prediction apparatus determines the scaling factor according to the weight coefficient, the method that the prediction apparatus predicts a video colour component may further include the following operation.

In 106, when the component differences corresponding to the any reference value are greater than a preset difference threshold, a weight coefficient of the neighboring reference sample corresponding to the any reference value is set as zero.

In the embodiment of the disclosure, after the prediction apparatus respectively performs the difference calculation between any reference value in the first colour component neighboring reference values and each first colour component reconstructed value to obtain the component differences corresponding to the any reference value and before the prediction apparatus determines the scaling factor according to the weight coefficient, if the component differences corresponding to the any reference value are greater than the preset difference threshold, the prediction apparatus may set the weight coefficient of the neighboring reference sample corresponding to the any reference value as zero.

It is to be noted that, in the embodiment of the disclosure, after obtaining the component differences corresponding to the any reference value, the prediction apparatus may compare the component differences with the preset difference threshold. If all component differences corresponding to the any reference value are greater than the preset difference threshold, it may be considered that the any first colour component neighboring reference value has a large deviation from the current coding block. Therefore, the prediction apparatus may remove the neighboring reference sample corresponding to the any first colour component neighboring reference value, i.e., sets the weight coefficient of the neighboring reference sample corresponding to the any reference value as zero.

Further, in the embodiment of the disclosure, before the prediction apparatus calculates the linear model, correlations between the first colour component reconstructed values and the first colour component neighboring reference values of the current coding block may be considered, i.e., the first colour component neighboring reference values are screened according to the differences between the first colour component neighboring reference values and the first colour component reconstructed values.

Further, in the embodiment of the disclosure, the prediction apparatus may preset a threshold, i.e., the preset difference threshold, then traverse each reference value in the first colour component neighboring reference values to obtain the differences with each first colour component reconstructed value of the current coding block. If the minimum value of differences between one of the first colour component neighboring reference values and each first colour component reconstructed value is greater than the preset difference threshold, the prediction apparatus may consider that the neighboring reference sample is an interference sample for accurate calculation of the linear model and may remove the interference sample from the training samples of the linear model, such that the first colour component neighboring reference values from which the interference sample is removed may be taken as the training samples of the linear model to calculate model parameters.

Figure 8:
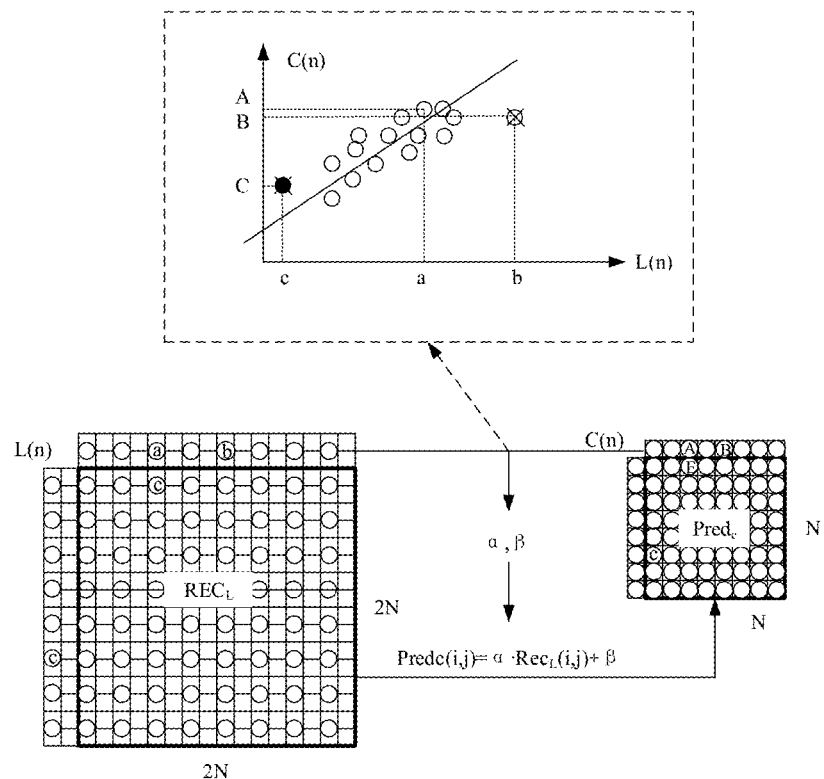
FIG. 8 is a schematic diagram for removing an interference sample in an embodiment of the disclosure.

In the embodiment of the disclosure, FIG. 8 is a schematic diagram for removing an interference sample in an embodiment of the disclosure. As illustrated in FIG. 8, if a first colour component value in the first colour component neighboring reference values of the current coding block is deviated from the first colour component reconstructed values of the current coding block, when the linear model is calculated, this sample is removed and is not taken as a training sample of the linear model. In such case, the calculated linear model is more accurate.

In the embodiments of the disclosure, the prediction apparatus may determine the correlation coefficients based on the first colour component neighboring reference values and first colour component reconstructed values corresponding to the current coding block, thereby allocating different weight coefficients to different neighboring reference samples according to correlations of component parameters between the neighboring reference samples and the current coding block to construct a linear model that is more suitable for the expected model, so as to effectively overcome the defects that the linear model is deviated from the expected model when the first colour component neighboring reference values are greatly deviated from corresponding component parameters of the current coding block, or, the third colour component neighboring reference values are greatly deviated from the corresponding component parameters of the current coding block, and greatly improve the prediction accuracy of the video colour component predicted value when predicting components of the current coding block according to the linear model, thereby making the video colour component predicted value closer to a real video colour component value.

Embodiment 3

Based on Embodiment 1, in the embodiment of the disclosure, before the prediction apparatus determines the scaling factor according to the weight coefficients, i.e., the operation in 104, the method that the prediction apparatus predicts the video colour component may further include the following operation.

In 107, a second colour component neighboring reference value corresponding to the current coding block is acquired. The second colour component neighboring reference value is a second component parameter corresponding to the neighboring reference sample and different from the first colour component parameter.

In the embodiment of the disclosure, before determining the scaling factor according to the weight coefficient, the prediction apparatus may first acquire the second colour component neighboring reference value corresponding to the current coding block.

It is to be noted that, in the embodiment of the disclosure, the second colour component neighboring reference value is a second component parameter corresponding to the neighboring reference sample and different from the first colour component parameter.

In the embodiment of the disclosure, the scaling factor includes a first scaling parameter and a second scaling parameter, and the method that the prediction apparatus determines the scaling factor according to the weight coefficient may include the following operations.

In 104a, the weight coefficient, the first colour component neighboring reference value and the second colour component neighboring reference value are input to a first preset factor calculation model to obtain the first scaling parameter.

In the embodiment of the disclosure, after inputting the correlation coefficient to the preset weight calculation model to obtain the weight coefficient corresponding to the first colour component neighboring reference value, the prediction apparatus may input the weight coefficient, the first colour component neighboring reference value and the second colour component neighboring reference value to the first preset factor calculation model and obtain the first scaling parameter.

It is to be noted that, in the embodiment of the disclosure, if the preset apparatus predicts the second colour component with the first colour component, the scaling factor may include the first scaling parameter and the second scaling parameter. The first scaling parameter and the second scaling parameter are configured to construct the second colour component predicted values according to the first colour component reconstructed values.

Further, in the embodiment of the disclosure, if the prediction apparatus further determines calculation of the first scaling parameter according to the first colour component neighboring reference values and the second colour component neighboring reference values, the first preset factor calculation model may be used, as illustrated in the following formula (6):

$$\alpha = \frac{\sum w(n) \cdot \sum (w(n) \cdot L(n) \cdot C(n)) - \sum (w(n) \cdot L(n)) \cdot \sum (w(n) \cdot C(n))}{\sum w(n) \cdot \sum (w(n) \cdot L(n) \cdot L(n)) - \sum (w(n) \cdot L(n)) \cdot \sum (w(n) \cdot L(n))} \quad (6)$$

Where, α is the first scaling parameter, L(n) represents a first colour component neighboring reference value on the left side and the upper side during down-sampling, C(n) represents a second colour component neighboring reference value on the left side and the upper side, and w(n) is a weight coefficient corresponding to each first colour component neighboring reference value.

In 104b, the weight coefficient, the first scaling parameter, the first colour component neighboring reference value and the second colour component neighboring reference value are input to a second preset factor calculation model to obtain the second scaling parameter.

In the embodiment of the disclosure, after inputting the weight coefficient, the first colour component neighboring reference value and the second colour component neighboring reference value to the first preset factor calculation model to obtain the first scaling parameter, the prediction apparatus may continue to input the weight coefficient, the first scaling parameter, the first colour component neighboring reference value and the second colour component neighboring reference value to the second preset factor calculation model to obtain the second scaling parameter.

Further, in the embodiment of the disclosure, if the prediction apparatus further determines calculation of the second scaling parameter according to the first colour component neighboring reference value and the second colour component neighboring reference value, the second preset factor calculation model may be used, as illustrated in the following formula (7):

$$\beta = \frac{\sum (w(n) \cdot C(n)) - \alpha \cdot \sum (w(n) \cdot L(n))}{\sum w(n)} \tag{7}$$

Where, $\beta$ is the second scaling parameter, L(n) represents a first colour component neighboring reference value on the left side and the upper side during down-sampling, C(n) represents a second colour component neighboring reference value on the left side and the upper side, and w(n) is a weight coefficient corresponding to each neighboring reference sample.

In the embodiment of the disclosure, before the prediction apparatus determines the scaling factor according to the weight coefficient, i.e., the operation in 104, the method that the prediction apparatus predicts a video colour component may further include the following operation.

In 108, a second colour component neighboring reference value and a third colour component neighboring reference value corresponding to the current coding block are acquired. The second colour component neighboring reference value and the third colour component neighboring reference value respectively represent a second colour component parameter and a third colour component parameter of the neighboring reference sample.

In the embodiment of the disclosure, before determining the scaling factor according to the weight coefficient, the prediction apparatus may first acquire the second colour component neighboring reference value and third colour component neighboring reference value corresponding to the current coding block.

It is to be noted that, in the embodiment of the disclosure, the second colour component neighboring reference value and the third colour component neighboring reference value respectively represent the second colour component parameter and the third colour component parameter of the neighboring reference sample. Specifically, the third colour component neighboring reference value and the second colour component neighboring reference value may be used to perform prediction between the same components.

Further, in the embodiment of the disclosure, the third colour component neighboring reference value and the second colour component neighboring reference value may respectively be neighboring reference Cb value and neighboring reference Cr value corresponding to the neighboring reference sample.

In the embodiment of the disclosure, before the prediction apparatus obtains the second colour component predicted value corresponding to the current coding block based on the scaling factor, i.e., the operation in 105, the method that the prediction apparatus predicts a video colour component may further include the following operation.

In 109, a second colour component estimated value and a third colour component reconstructed residual corresponding to the current coding block are acquired.

In the embodiment of the disclosure, before obtaining the second colour component predicted value corresponding to the current coding block according to the scaling factor, the prediction apparatus may first acquire the second colour component estimated value and third colour component reconstructed residual corresponding to the current coding block.

It is to be noted that, in the embodiment of the disclosure, the second colour component estimated value is obtained by performing conventional component prediction on the second colour component corresponding to the current coding block, and the third colour component reconstructed residual is configured to represent a predicted residual of the third colour component corresponding to the current coding block.

In the embodiment of the disclosure, the scaling factor includes a third scaling parameter, and the method that the prediction apparatus determines the scaling factor according to the weight coefficient may include the following operations.

In 104c, the weight coefficient, the third colour component neighboring reference value and the second colour component neighboring reference value are input to a third preset factor calculation model to obtain the third scaling parameter.

In the embodiment of the disclosure, after inputting the correlation coefficient to the preset weight calculation model to obtain the weight coefficient corresponding to the neighboring reference sample, the prediction apparatus may input the weight coefficient, the third colour component neighboring reference value and the second colour component neighboring reference value to the third preset factor calculation model to obtain the third scaling parameter.

It is to be noted that, in the embodiment of the disclosure, if the prediction apparatus performs prediction between the second colour component and the third colour component, the scaling factor may include the third scaling parameter.

Further, in the embodiment of the disclosure, if the prediction apparatus further determines calculation of the third scaling parameter according to the third colour component neighboring reference value and the second colour component neighboring reference value, the third preset factor calculation model may be used, as illustrated in the following formula (8):

$$\gamma = \frac{\sum w(n) \cdot \sum \cdot (w(n) \cdot Cb(n) \cdot Cr(n)) - \sum (w(n) \cdot Cb(n)) \cdot \sum (w(n) \cdot Cr(n)) + \lambda \cdot (-0.5)}{\sum w(n) \cdot \sum (w(n) \cdot Cb(n) \cdot Cb(n)) - \sum (w(n) \cdot Cb(n)) \cdot \sum (w(n) \cdot Cb(n)) + \lambda} \tag{8}$$

Where, $\gamma$ is the third scaling parameter, Cb(n) represents a neighboring reference Cb value of the current coding block, i.e., the third colour component neighboring reference value, Cr(n) represents a neighboring reference Cr value of the current coding block, i.e., the second colour component neighboring reference value, $\lambda$ may be an empirical value, and w(n) is a weight coefficient corresponding to each neighboring reference sample.

In the embodiments of the disclosure, the prediction apparatus may determine the correlation coefficients based on the first colour component neighboring reference values and first colour component reconstructed values corresponding to the current coding block, thereby allocating different weight coefficients to different neighboring reference samples according to correlations of component parameters between the neighboring reference samples and the current coding block to construct a linear model that is more suitable for the expected model, so as to effectively overcome the defects that the linear model is deviated from the expected model when the first colour component neighboring reference values are greatly deviated from corresponding component parameters of the current coding block, or, the third colour component neighboring reference values are greatly deviated from the corresponding component parameters of the current coding block, and greatly improve the prediction accuracy of the video colour component predicted value when predicting components of the current coding block according to the linear model, thereby making the video colour component predicted value closer to a real video colour component value.

Embodiment 4

Based on Embodiment 3, in the embodiment of the disclosure, the method that the prediction apparatus obtains the second colour component predicted value corresponding to the current coding block based on the scaling factor may include the following operation.

In 105a, the second colour component predicted value is obtained according to the first scaling parameter, the second scaling parameter and the first colour component reconstructed value.

In the embodiment of the disclosure, after determining the scaling factor according to the weight coefficient, the prediction apparatus may further obtain the second colour component predicted value according to the first colour component reconstructed value and the scaling factor including the first scaling parameter and the second scaling parameter.

It is to be noted that, in the embodiment of the disclosure, after obtaining the scaling factor including the first scaling parameter and the second scaling parameter, the prediction apparatus may establish, according to the first scaling parameter, the second scaling parameter and the first colour component reconstructed values, a linear model for predicting the video colour component, such that the second colour component of the current coding block may be constructed according to the linear model to obtain the second colour component predicted values.

Further, in the embodiment of the disclosure, the prediction apparatus may determine the second colour component predicted values according to the formula (1), i.e., the prediction apparatus may calculate the second colour component predicted values according to the first scaling parameter, the second scaling parameter and the first colour component reconstructed values.

In the embodiment of the disclosure, the method that the prediction apparatus obtains the second colour component predicted value corresponding to the current coding block based on the scaling factor may further include the following operations.

In 105b, the second colour component predicted value is obtained according to the third scaling parameter, the second colour component estimated value and the third colour component reconstructed residual.

In the embodiment of the disclosure, after determining the scaling factor according to the weight coefficient, the prediction apparatus may further obtain the second colour component predicted value according to the scaling factor including the third scaling parameter, the second colour component estimated value and the third colour component reconstructed residual.

It is to be noted that, in the embodiment of the disclosure, after obtaining the scaling factor including the third scaling parameter, the prediction apparatus may establish, according to the third scaling parameter, the second colour component estimated values and the third colour component reconstructed residuals, a linear model for predicting the video colour component, such that the second colour component of the current coding block may be constructed according to the linear model to obtain the second colour component predicted values.

Further, in the embodiment of the disclosure, the prediction apparatus may determine the second colour component predicted values through the formula (3), i.e., the prediction apparatus may calculate the second colour component predicted values according to the third scaling parameter, the second colour component estimated values and the third colour component reconstructed residuals.

In the embodiments of the disclosure, the prediction apparatus may determine the correlation coefficients based on the corresponding first colour component neighboring reference values and first colour component reconstructed values of the current coding block, thereby allocating different weight coefficients to different neighboring reference samples according to correlations of component parameters between the neighboring reference samples and the current coding block to construct a linear model that is more suitable for the expected model, so as to effectively overcome the defects that the linear model is deviated from the expected model when the first colour component neighboring reference values are greatly deviated from corresponding component parameters of the current coding block, or, the third colour component neighboring reference values are greatly deviated from the corresponding component parameters of the current coding block, and greatly improve the prediction accuracy of the video colour component predicted value when predicting components of the current coding block according to the linear model, thereby making the video colour component predicted value closer to a real video colour component value.

Embodiment 5

Figure 9:
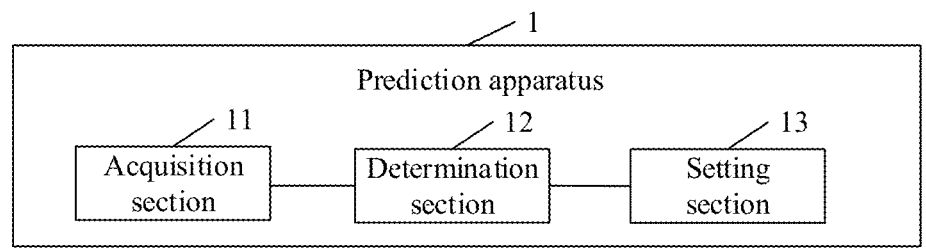
FIG. 9 is a first schematic structural diagram of a prediction apparatus provided by an embodiment of the disclosure.

Based on the same inventive concept as Embodiment 1 to Embodiment 4, FIG. 9 is a first schematic structural diagram of a prediction apparatus provided by an embodiment of the disclosure. The prediction apparatus 1 provided by the embodiment of the disclosure may include an acquisition section 11, a determination section 12 and a setting section 13.

The acquisition section 11 is configured to acquire a first colour component neighboring reference value and a first colour component reconstructed value corresponding to a current coding block. The first colour component neighboring reference value represents a first colour component parameter corresponding to a neighboring reference sample of the current coding block, and the first colour component reconstructed value represents one or more reconstructed parameters of the first colour component corresponding to the current coding block.

The determination section 12 is configured to determine a correlation coefficient according to the first colour component neighboring reference value and the first colour component reconstructed value after the acquisition section 11 acquires the first colour component neighboring reference value and first colour component reconstructed value corresponding to the current coding block. The correlation coefficient represents a degree of colour component deviation between the current coding block and the neighboring reference sample.

The acquisition section 11 is further configured to obtain a weight coefficient corresponding to the neighboring reference sample by inputting the correlation coefficient to a preset weight calculation model after the determination section 12 determines the correlation coefficient according to the first colour component neighboring reference value and the first colour component reconstructed value.

The determination section 12 is further configured to determine, after the acquisition section 11 inputs the correlation coefficient to the preset weight calculation model to obtain the weight coefficient corresponding to the neighboring reference sample, a scaling factor according to the weight coefficient.

The acquisition section 11 is further configured to obtain a second colour component predicted value corresponding to the current coding block based on the scaling factor after the determination section 12 determines the scaling factor according to the weight coefficient.

Further, in the embodiment of the disclosure, the determination section 12 is specifically configured to perform difference calculation between any reference value in the first colour component neighboring reference values and each first colour component reconstructed value to obtain component differences corresponding to the any reference value, one first colour component neighboring reference value and one first colour component reconstructed value corresponding to one difference, and determine a minimum difference in component differences as the correlation coefficient.

Further, in the embodiment of the disclosure, the acquisition section 11 is further configured to acquire a second colour component neighboring reference value corresponding to the current coding block before the scaling factor is determined according to the weight coefficient. The second colour component neighboring reference value is a second colour component parameter corresponding to the neighboring reference sample and different from the first colour component parameter.

Further, in the embodiment of the disclosure, the scaling factor includes a first scaling parameter and a second scaling parameter. The determination section 12 is further specifically configured to input the weight coefficient, the first colour component neighboring reference value and the second colour component neighboring reference value to a first preset factor calculation model to obtain the first scaling parameter, and input the weight coefficient, the first scaling parameter, the first colour component neighboring reference value and the second colour component neighboring reference value to a second preset factor calculation model to obtain the second scaling parameter.

Further, in the embodiment of the disclosure, the acquisition section 11 is further configured to acquire a third colour component neighboring reference value and a second colour component neighboring reference value corresponding to the current coding block before the scaling factor is determined according to the weight coefficient. The second colour component neighboring reference value and the third colour component neighboring reference value respectively represent a second colour component parameter and a third colour component parameter of the neighboring reference sample.

Further, in the embodiment of the disclosure, the acquisition section 11 is further configured to acquire a second colour component estimated value and a third colour component reconstructed residual corresponding to the current coding block before obtaining the second colour component predicted value of the current coding block based on the scaling factor. The second colour component estimated value is obtained by performing component prediction according to a second colour component corresponding to the current coding block, and the third colour component reconstructed residual represents a predicted residual corresponding to the current coding block.

Further, in the embodiment of the disclosure, the scaling factor includes a third scaling parameter. The determination section 12 is further configured to input the weight coefficient, the second colour component neighboring reference value and the third colour component neighboring reference value to a third preset factor calculation model to obtain the third scaling parameter.

Further, in the embodiment of the disclosure, the acquisition section 11 is specifically configured to obtain the second colour component predicted value according to the first scaling parameter, the second scaling parameter and the first colour component reconstructed value.

Further, in the embodiment of the disclosure, the acquisition section 11 is further specifically configured to obtain the second colour component predicted value according to the third scaling parameter, the second colour component estimated value and the third colour component reconstructed residual.

Further, in the embodiment of the disclosure, the setting section 13 is configured to set, after the difference calculation is performed between any reference value in the first colour component neighboring reference values and each first colour component reconstructed value to obtain the component differences corresponding to the any reference value and before the scaling factor is determined according to the weight coefficient, when the component differences corresponding to the any reference value are greater than a preset difference threshold, a weight coefficient of the neighboring reference sample corresponding to the any reference value as zero.

Figure 10:
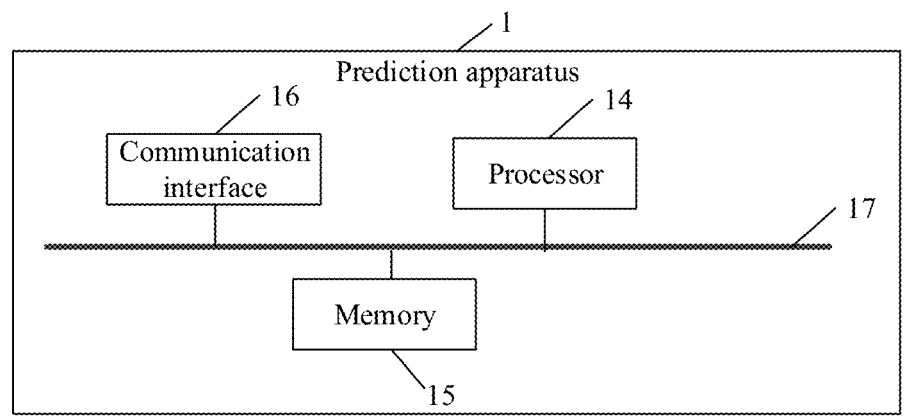
FIG. 10 is a second schematic structural diagram of a prediction apparatus provided by an embodiment of the disclosure.

FIG. 10 is a second schematic structural diagram of a prediction apparatus provided by an embodiment of the disclosure. As illustrated in FIG. 10, the prediction apparatus 1 provided by the embodiment of the disclosure may include a processor 14, a memory 15 storing an instruction executable by the processor 14, a communication interface 16, and a bus 17 used for connecting the processor 14, the memory 15 and the communication interface 16.

In the embodiment of the disclosure, the processor 14 may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller or a microprocessor. It is to be understood that, for different devices, the electronic device for implementing functions of the processor may further be another device, which is not specifically defined in the embodiments of the disclosure. The apparatus 1 may further include the memory 15. The memory 15 may be connected to the processor 14. The memory 15 is configured to store an executable program code including a computer operation instruction. The memory 15 may include a high-speed RAM memory, and may further include a non-volatile memory such as at least two disk memories.

In the embodiment of the disclosure, the bus 17 is configured for connection of the communication interface 16, the processor 14 and the memory 15 as well as mutual communication among these devices.

In the embodiment of the disclosure, the memory 15 is configured to store instructions and data.

Further, in the embodiment of the disclosure, the processor 14 is configured to acquire a first colour component neighboring reference value and a first colour component reconstructed value corresponding to a current coding block, the first colour component neighboring reference value representing a first colour component parameter corresponding to a neighboring reference sample of the current coding block, and the first colour component reconstructed value representing one or more reconstructed parameters of the first colour component corresponding to the current coding block, determine a correlation coefficient according to the first colour component neighboring reference value and the first colour component reconstructed value, the correlation coefficient representing a degree of colour component deviation between the current coding block and the neighboring reference sample, obtain a weight coefficient corresponding to the neighboring reference sample by inputting the correlation coefficient to a preset weight calculation model, determine a scaling factor according to the weight coefficient and obtain a second colour component predicted value corresponding to the current coding block based on the scaling factor.

During actual applications, the memory 15 may be a first volatile memory such as a first Random-Access Memory (RAM), or a first non-volatile memory such as a first Read-Only Memory (ROM), a first flash memory, a Hard Disk Drive (HDD) or a Solid-State Drive (SSD), or a combination of the above first memories, and provide instructions and data for the processor 14.

In addition, each functional module in the embodiment may be integrated into a processing unit, each unit may also exist independently, and two or more than two units may also be integrated into one unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solutions of the embodiment substantially or parts making contributions to the related art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the embodiments. The foregoing storage medium includes any medium that can store a program code, such as a U disk, a mobile hard disk, an ROM, an RAM, a magnetic disk, or an optical disc.

According to the apparatus provided by the embodiment of the disclosure, the prediction apparatus may determine the correlation coefficients based on the first colour component neighboring reference values and first colour component reconstructed values corresponding to the current coding block, thereby allocating different weight coefficients to different neighboring reference samples according to correlations of component parameters between the neighboring reference samples and the current coding block to construct a linear model that is more suitable for the expected model, so as to effectively overcome the defects that the linear model is deviated from the expected model when the first colour component neighboring reference values are greatly deviated from corresponding component parameters of the current coding block, or, the third colour component neighboring reference values are greatly deviated from the corresponding component parameters of the current coding block, and greatly improve the prediction accuracy of the video colour component predicted value when predicting components of the current coding block according to the linear model, thereby making the video colour component predicted value closer to a real video colour component value.

An embodiment of the disclosure provides a first computer readable storage medium, which stores a program. The program is executed by a processor to implement the method in Embodiment 1 to Embodiment 4.

Specifically, a program instruction corresponding to the method for predicting a video colour component in the embodiments may be stored on storage media such as an optical disc, a hard disk and a U disk. When the program instruction corresponding to the method for predicting the video colour component in the storage medium is read or executed by an electronic device, the following operations are included.

A first colour component neighboring reference value and a first colour component reconstructed value corresponding to a current coding block are acquired. The first colour component neighboring reference value represents a first colour component parameter corresponding to a neighboring reference sample of the current coding block, and the first colour component reconstructed value represents one or more reconstructed parameters of the first colour component corresponding to the current coding block.

A correlation coefficient is determined according to the first colour component neighboring reference value and the first colour component reconstructed value. The correlation coefficient represents a degree of colour component deviation between the current coding block and the neighboring reference sample.

A weight coefficient corresponding to the neighboring reference sample is obtained by inputting the correlation coefficient to a preset weight calculation model.

A scaling factor is determined according to the weight coefficient.

A second colour component predicted value corresponding to the current coding block is obtained based on the scaling factor.

Those skilled in the art should understand that the embodiments of the present disclosure may be provided as a method, a system or a computer program product. Thus, the disclosure may adopt forms of hardware embodiments, software embodiments or embodiments combining software and hardware. Moreover, the disclosure may adopt a form of the computer program product implemented on one or more computer available storage media (including, but not limited to, a disk memory and an optical memory or the like) including computer available program codes.

The disclosure is described with reference to flowcharts and/or block diagrams of the method, the device (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided to a general computer, a dedicated computer, an embedded processor or processors of other programmable data processing devices to generate a machine, so that an apparatus for realizing functions designated in one or more flows of the flowcharts and/or one or more blocks of the block diagrams is generated via instructions executed by the computer or the processor of the other programmable data processing devices.

These computer program instructions may also be stored in a computer readable memory capable of guiding the computer or the other programmable data processing device to work in a specific mode, so that a manufactured product including an instruction apparatus is generated via the instructions stored in the computer readable memory. The instruction apparatus achieves the functions designated in one or more flows of the flowcharts and/or one or more blocks of the block diagrams.

These computer program instructions may also be loaded to the computer or the other programmable data processing device, so that a series of operations are executed on the computer or the other programmable device to generate computer-implemented processing, and therefore the instructions executed on the computer or the other programmable device provide a step of realizing the functions designated in one or more flows of the flowcharts and/or one or more blocks of the block diagrams.

The above are merely preferred embodiments of the disclosure, not intended to limit the protection scope of the disclosure.

INDUSTRIAL APPLICABILITY

According to the method and apparatus for predicting the video colour component and a computer storage medium provided by the embodiments of the disclosure, the prediction apparatus may determine the correlation coefficients based on the first colour component neighboring reference values and first colour component reconstructed values corresponding to the current coding block, thereby allocating different weight coefficients to different neighboring reference samples according to correlations of component parameters between the neighboring reference samples and the current coding block to construct a linear model that is more suitable for the expected model, so as to effectively overcome the defects that the linear model is deviated from the expected model when the first colour component neighboring reference values are greatly deviated from corresponding component parameters of the current coding block, or, the third colour component neighboring reference values are greatly deviated from the corresponding component parameters of the current coding block, and greatly improve the prediction accuracy of the video colour component predicted value when predicting components of the current coding block according to the linear model, thereby making the video colour component predicted value closer to a real video colour component value.

The invention claimed is:

1. A method for predicting a video colour component, applied to a decoder and comprising:
acquiring a first colour component neighboring reference value and a first colour component reconstructed value corresponding to a current block, wherein the first colour component neighboring reference value represents a first colour component parameter corresponding to a neighboring reference sample of the current block, and the first colour component reconstructed value represents one or more reconstructed parameters of a first colour component corresponding to the current block;
determining a weight coefficient corresponding to the neighboring reference sample, wherein the weight coefficient is determined according to position of the current block and the neighboring reference sample;
determining a scaling factor according to the weight coefficient and the first colour component neighboring reference value; and
obtaining a second colour component predicted value corresponding to the current block based on a linear model corresponding to the scaling factor.

2. The method of claim 1, wherein
the position represents a position correlation between the current block and the neighboring reference sample.

3. The method of claim 1, before determining the scaling factor according to the weight coefficient and the first colour component neighboring reference value, further comprising:
acquiring a second colour component neighboring reference value corresponding to the current block, the second colour component neighboring reference value being a second colour component parameter corresponding to the neighboring reference sample and different from the first colour component parameter.

4. The method of claim 3, wherein determining the scaling factor according to the weight coefficient and the first colour component neighboring reference value comprises:
inputting the weight coefficient, the first colour component neighboring reference value and the second colour component neighboring reference value to a preset factor calculation model to obtain the scaling factor; and
obtaining the second colour component predicted value corresponding to the current block based on the linear model corresponding to the scaling factor comprises:
obtaining the second colour component predicted value based on the linear model corresponding to the scaling factor and the first colour component reconstructed value.

5. The method of claim 3, before obtaining the second colour component predicted value corresponding to the current block based on the linear model corresponding to the scaling factor, further comprising:
acquiring a second colour component estimated value corresponding to the current block, wherein the second colour component estimated value is obtained by performing component prediction according to a second colour component corresponding to the current block.

6. The method of claim 1, further comprising:
setting weight coefficients of part of reference samples corresponding to part of neighboring reference values as zero, wherein position correlations between the current block and the part of reference samples do not meet a preset threshold; or,
removing part of reference samples from the neighboring reference samples, wherein position correlations between the current block and the part of reference samples do not meet a preset threshold; or,
performing screening on the neighboring reference samples.

7. The method of claim 6, wherein performing screening on the neighboring reference samples comprises:
performing downsampling on the neighboring reference samples to determine part of reference samples.

8. The method of claim 1, wherein neighboring reference samples comprise at least one of an upper reference sample of the current block, an upper-left reference sample of the current block or a left reference sample of the current block; and the neighboring reference samples further comprise at least one of an upper-right reference sample of the current block or a bottom-left reference sample of the current block.

9. A decoder, comprising a processor, a memory storing an instruction executable by the processor, wherein the instruction is executed by the processor to implement a method for predicting a video colour component, comprising:

acquiring a first colour component neighboring reference value and a first colour component reconstructed value corresponding to a current block, wherein the first colour component neighboring reference value represents a first colour component parameter corresponding to a neighboring reference sample of the current block, and the first colour component reconstructed value represents one or more reconstructed parameters of a first colour component corresponding to the current block;

determining a weight coefficient corresponding to the neighboring reference sample, wherein the weight coefficient is determined according to position between the current block and the neighboring reference sample;

determining a scaling factor according to the weight coefficient and the first colour component neighboring reference value; and obtaining a second colour component predicted value corresponding to the current block based on a linear model corresponding to the scaling factor.

10. The decoder of claim 9, wherein
the position represents a position correlation between the current block and the neighboring reference sample.

11. The decoder of claim 9, wherein the processor is configured to, before determining the scaling factor according to the weight coefficient and the first colour component neighboring reference value, acquire a second colour component neighboring reference value corresponding to the current block, the second colour component neighboring reference value being a second colour component parameter corresponding to the neighboring reference sample and different from the first colour component parameter.

12. The decoder of claim 11, wherein the processor is configured to:

input the weight coefficient, the first colour component neighboring reference value and the second colour component neighboring reference value to a preset factor calculation model to obtain the scaling factor; and the processor is further configured to obtain the second colour component predicted value based on the linear model corresponding to the scaling factor and the first colour component reconstructed value.

13. The decoder of claim 11, wherein the processor is configured to, before obtaining the second colour component predicted value corresponding to the current block based on the linear model corresponding to the scaling factor, acquire a second colour component estimated value corresponding to the current block, wherein the second colour component estimated value is obtained by performing component prediction according to a second colour component corresponding to the current block.

14. The decoder of claim 9, wherein the processor is configured to:

set weight coefficients of part of reference samples corresponding to part of neighboring reference values as zero, wherein position correlations between the current block and the part of reference samples do not meet a preset threshold; or, remove part of reference samples from the neighboring reference samples, wherein position correlations between the current block and the part of reference samples do not meet a preset threshold; or, perform screening on the neighboring reference samples.

15. The decoder of claim 14, wherein the processor is configured to:

perform downsampling on the neighboring reference samples to determine part of reference samples.

16. The decoder of claim 9, wherein neighboring reference samples comprise at least one of an upper reference sample of the current block, an upper-left reference sample of the current block or a left reference sample of the current block; and the neighboring reference samples further comprise at least one of an upper-right reference sample of the current block or a bottom-left reference sample of the current block.

17. A method for predicting a video colour component, applied to an encoder and comprising:

acquiring a first colour component neighboring reference value and a first colour component reconstructed value corresponding to a current coding block, wherein the first colour component neighboring reference value represents a first colour component parameter corresponding to a neighboring reference sample of the current coding block, and the first colour component reconstructed value represents one or more reconstructed parameters of a first colour component corresponding to the current coding block;

determining a weight coefficient corresponding to the neighboring reference sample, wherein the weight coefficient is determined according to position between the current block and the neighboring reference sample;

determining a scaling factor according to the weight coefficient and the first colour component neighboring reference value; and obtaining a second colour component predicted value corresponding to the current coding block based on a linear model corresponding to the scaling factor.

18. The method of claim 17, wherein
the position represents a position correlation between the current coding block and the neighboring reference sample.

19. The method of claim 17, before determining the scaling factor according to the weight coefficient and the first colour component neighboring reference value, further comprising:

acquiring a second colour component neighboring reference value corresponding to the current coding block, the second colour component neighboring reference value being a second colour component parameter corresponding to the neighboring reference sample and different from the first colour component parameter.

20. The method of claim 19, wherein the first colour component neighboring reference value and the first colour component reconstructed value corresponding to the current coding block comprise at least two groups of first colour component neighboring reference values and first colour component reconstructed values, the method further comprises:
- determining weight coefficients for each group of first colour component neighboring reference values and first colour component reconstructed values;
- inputting the weight coefficients, the first colour component neighboring reference values and the second colour component neighboring reference values to the preset factor calculation model to obtain at least two groups of scaling factors corresponding to the at least two groups of first colour component neighboring reference values and first colour component reconstructed values; and
- selecting one group of scaling factors from the at least two groups of scaling factors.

21. The method of claim 17, wherein obtaining the second colour component predicted value corresponding to the current coding block based on the linear model corresponding to the scaling factor comprises:
- obtaining the second colour component predicted value based on the linear model corresponding to the scaling factor and the first colour component reconstructed value.

22. The method of claim 17, further comprising:
- setting weight coefficients of part of reference samples corresponding to part of neighboring reference values as zero, wherein position correlations between the current coding block and the part of reference samples do not meet a preset threshold; or,
- removing part of reference samples from the neighboring reference samples, wherein position correlations between the current coding block and the part of reference samples do not meet a preset threshold; or
- performing screening on the neighboring reference samples.

23. The method of claim 17, wherein neighboring reference samples comprise at least one of an upper reference sample of the current coding block, an upper-left reference sample of the current coding block or a left reference sample of the current coding block; and
the neighboring reference samples further comprise at least one of an upper-right reference sample of the current coding block or a bottom-left reference sample of the current coding block.

24. An encoder, comprising a processor, a memory storing an instruction executable by the processor, wherein the instruction is executed by the processor to implement a method for predicting a video colour component, comprising:
- acquiring a first colour component neighboring reference value and a first colour component reconstructed value corresponding to a current coding block, wherein the first colour component neighboring reference value represents a first colour component parameter corresponding to a neighboring reference sample of the current coding block, and the first colour component reconstructed value represents one or more reconstructed parameters of a first colour component corresponding to the current coding block;
- determining a weight coefficient corresponding to the neighboring reference sample, wherein the weight coefficient is determined according to position between the current block and the neighboring reference sample;
- determining a scaling factor according to the weight coefficient and the first colour component neighboring reference value; and
- obtaining a second colour component predicted value corresponding to the current coding block based on a linear model corresponding to the scaling factor.

25. The encoder of claim 24, wherein
the position represents a position correlation between the current coding block and the neighboring reference sample.

26. The encoder of claim 24, wherein the processor is configured to, before determining the scaling factor according to the weight coefficient and the first colour component neighboring reference value,
acquire a second colour component neighboring reference value corresponding to the current coding block, the second colour component neighboring reference value being a second colour component parameter corresponding to the neighboring reference sample and different from the first colour component parameter.

27. The encoder of claim 26, wherein the first colour component neighboring reference value and the first colour component reconstructed value corresponding to the current coding block comprise at least two groups of first colour component neighboring reference values and first colour component reconstructed values, the processor is configured to:
- determine weight coefficients for each group of first colour component neighboring reference values and first colour component reconstructed values;
- input the weight coefficients, the first colour component neighboring reference values and the second colour component neighboring reference values to the preset factor calculation model to obtain at least two groups of scaling factors corresponding to the at least two groups of first colour component neighboring reference values and first colour component reconstructed values; and
- select one group of scaling factors from the at least two groups of scaling factors.

28. The encoder of claim 24, wherein the processor is configured to:
- obtain the second colour component predicted value based on the linear model corresponding to the scaling factor and the first colour component reconstructed value.

29. The encoder of claim 24, wherein the processor is configured to:
- set weight coefficients of part of reference samples corresponding to part of neighboring reference values as zero, wherein position correlations between the current coding block and the part of reference samples do not meet a preset threshold; or,
- remove part of reference samples from the neighboring reference samples, wherein position correlations between the current coding block and the part of reference samples do not meet a preset threshold; or
- perform screening on the neighboring reference samples.

30. The encoder of claim 24, wherein neighboring reference samples comprise at least one of an upper reference sample of the current coding block, an upper-left reference sample of the current coding block or a left reference sample of the current coding block; and
the neighboring reference samples further comprise at least one of an upper-right reference sample of the current coding block or a bottom-left reference sample of the current coding block.

* * * * *